United States Patent

[11] 3,610,963

[72] Inventor Edward R. Higgins
North Linthicum, Md.
[21] Appl. No. 33,432
[22] Filed Apr. 30, 1970
[45] Patented Oct. 5, 1971
[73] Assignee Westinghouse Electric Corporation
Pittsburgh, Pa.

[54] SWITCH DRIVE CIRCUIT FOR THE TIME RATIO CONTROLLED TRANSISTOR SWITCHING CIRCUITS

11 Claims, 5 Drawing Figs.

[52] U.S. Cl. 307/275, 331/112, 332/12, 307/253, 307/282
[51] Int. Cl. H03k 3/30
[50] Field of Search 307/275, 282; 331/112; 332/12

[56] References Cited

UNITED STATES PATENTS

| | | | |
|---|---|---|---|
| 3,136,960 | 6/1964 | Ausfresser | 332/12 |
| 3,158,791 | 11/1964 | Deneen et al. | 307/282 |

*Primary Examiner*—Donald D. Forrer
*Assistant Examiner*—Harold A. Dixon
*Attorneys*—F. H. Henson, E. P. Klipfel and J. L. Wiegreffe

ABSTRACT: An output transistor switch is driven "on" and "off" by means of the secondary winding of a transformer having a relatively large primary to secondary turns ratio with the primary winding having one end coupled to another or "-drive" transistor switch operated by means of a control circuit. The other end of the primary winding is coupled back to the drive transistor switch by means of a semiconductor diode which becomes momentarily conductive when the drive transistor is driven "on" to cause a virtual short circuit to be reflected to the secondary winding which turns the output transistor switch immediately "off." An output load is connected across collector-emitter circuit of the output transistor switch in series with another secondary winding which is poled with respect to the first mentioned secondary winding so as to provide a positive feedback for the base drive of the output transistor switch which is a function of the load current. The primary winding of the transformer is additionally coupled to a supply potential and a resistor in series for altering the flux state of the transformer to reset the core thereof and aid in holding the output transistor switch "off" when the drive transistor is "on."

SWITCH DRIVE CIRCUIT FOR THE TIME RATIO CONTROLLED TRANSISTOR SWITCHING CIRCUITS

BACKGROUND OF THE INVENTION

1. Field of the Invention

This invention relates to transistor switching circuits employing transformer isolation between transistor switches and more particularly to a time ratio controlled transistor switching circuit which may be used, for example, in voltage regulators, servoamplifiers, DC to AC inverters, lamp ballasts, pulse frequency modulators, pulse width modulators, etc.

2. Description of the Prior Art

Circuits utilizing switching transistors which are driven conductive for variable periods of time is well known to those skilled in the art. One type of such circuit is the pulse width modulator which produces a signal output, the pulse width of which is proportional to the amplitude of a control voltage and which employs a saturable magnetic core member to achieve pulse width modulation. Typically, the following patents are illustrative of pulse width modulators utilizing transistor switches:

U.S. Pat. No. 2,780,782, R. L. Bright
U.S. Pat. No. 2,875,412, H. Kaplan
U.S. Pat. No. 3,136,960, H. D. Ausfresser Each of the above-referenced prior art patents utilize a pair of transistors respectively coupled to the primary and secondary winding of a saturable core transformer. Also, the Kaplan and Ausfresser patents include an additional secondary winding coupled to a respective switching transistor for providing a regenerative feedback action to maintain the transistor conducting when a reset voltage is applied to the primary winding. Furthermore, a third separate secondary winding is coupled to the saturable core for providing a parallel output to a suitable load.

While the above-recited prior art operates in the manner intended, the present invention is directed to a transistor switch circuit employing transformer coupled switch transistors wherein the need for a saturable core transformer is removed and the load is series connected to one of the transistor switches. At the same time a positive feedback circuit is coupled in series with the load to provide drive proportional to the load current for the switching transistor.

SUMMARY

Briefly, the subject invention includes a first transistor having its collector circuit coupled to one terminal of the primary winding of a transformer having a primary to secondary turns ratio in the order of 10 to one. The opposite end of the primary winding is coupled to the emitter circuit of the first transistor by means of a semiconductor diode which becomes momentarily conductive when the first transistor is driven conductively into saturation by means of a control signal applied to the base circuit. Said opposite or, alternatively, another terminal of the primary winding is coupled to a first power supply potential by means of a series connected resistor. The transformer contains at least a pair of secondary windings having one respective end coupled together. One of the secondary windings has its other end directly connected to the base circuit of a second transistor. A series circuit including the other secondary winding, an output load and a power supply source is coupled across the collector-emitter circuit of the second transistor. The two secondary windings are mutually poled so that said other secondary winding provides a positive feedback to the base circuit of the second transistor so that the base thereof is driven by a predetermined ratio of the load current when the first transistor is rendered nonconductive. The semiconductor diode coupled between the primary winding and the emitter of the first transistor acts in combination to produce a low impedance across the primary winding which is reflected as a substantially short circuit across the first recited secondary winding to render the second transistor immediately nonconductive which is then held nonconductive by the resetting of the flux in the transformer when the first transistor is again rendered conductive.

DESCRIPTION OF THE PREFERRED EMBODIMENTS

Figures 1, 2, 4:
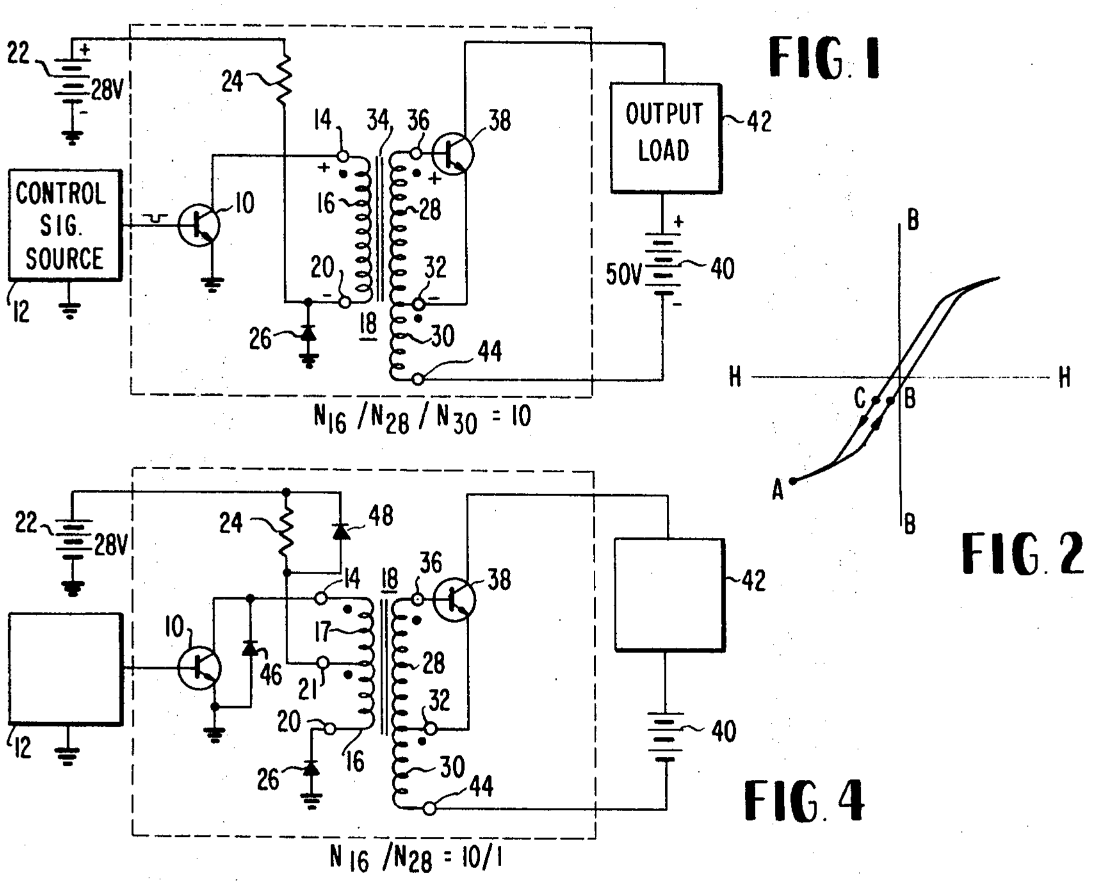
FIG. 1 is an electrical schematic diagram of a first embodiment of the subject invention.
FIG. 2 is a graphical illustration of the B–H magnetization characteristic curve of a transformer utilized by the subject invention.
FIG. 4 is an electrical schematic diagram illustrative of a second embodiment of the subject invention.

Referring now to the drawings wherein like reference numerals refer to like parts, FIG. 1 discloses the basic embodiment of the subject invention. A first or "drive" N–P–N transistor 10 is coupled by means of its base electrode to a control signal source 12 which is adapted to feed a signal to the transistor 10 rendering it selectively either conducting ('-'on") in a saturated mode of operation or nonconducting ('-'off"). Transistor 10 then acts as an open or closed switch. The collector electrode of the drive transistor 10 is connected to terminal 14 which is common to one end of a primary winding 16 of a transformer 18 having a hysteresis characteristic such as shown in FIG. 2. The other end of the primary winding 16 which is common to terminal 20 is connected to a positive B+ supply voltage provided by a supply source 22 by means of the resistor 24. A semiconductor diode 26 has its cathode electrode directly connected to the terminal 20 while the cathode electrode is commonly connected to the emitter electrode of transistor 10. The semiconductor diode 26 is vital to the operation of the subject invention for reasons which become evident when the operation of the embodiment is subsequently considered.

The transformer 18 includes at least two secondary windings 28 and 30 having a common terminal 32 therebetween. The windings 16, 28 and 30 are wound on a magnetic core 32 in a predetermined manner so that the induced voltages appearing at the respective ends thereof will have predetermined relative polarities. The ends of like instantaneous polarity are indicated on the drawing of FIG. 1 by dots.

Continuing further, the terminal 36 of secondary winding 28 is directly connected to the base of a second or output N–P–N transistor 38 which has its emitter electrode directly connected to the common terminal 32 of windings 28 and 32. The collector electrode of transistor 38 is connected to a second positive supply voltage provided by a second supply source 40 through a series output load 42. In the event that P–N–P transistors are utilized the polarity of the supply voltages and the diode 26 would merely be reversed for proper operation. The negative terminal of the supply source 40 is directly connected to the terminal 44 which is common to the other end of the second secondary winding 30. It is to be noted that the polarity dots of the two secondary windings 28 and 30 indicate that the second secondary winding 30 provides a positive feedback winding for the base of the output transistor 38 which is adapted to be rendered conductively saturated and nonconductive so as to operate as a series switch in combination with the load 42.

It should also be noted that the turns ratio $N_{16}/N_{28}=10/1=N_{28}/N_{30}$. Typically, the primary winding 16 has 200 turns, the first secondary winding 28 has 20 turns, and the second secondary winding 30 has two turns. It should be understood, however, that the specific transformer turns ratio can be altered to meet individual circuit requirements and transistor parameters.

Considering now the operation of the embodiments shown in FIG. 1, assume for sake of explanation that the N–P–N transistor 10 has been driven "on" and into saturation by a positive signal from the control signal source 12 for a time sufficient to bias the core 34 of transformer 18 to point A of FIG. 2 due to the collector current as determined by the value of the resistor 24 flowing through the series connected primary winding 16. The output transistor 38 which is in series with the output load 42 meanwhile is in a nonconducting or "off" condition. At a predetermined time later the control signal applied to the base of the transistor 10 is removed i.e. the signal goes to zero or a negative potential by the control circuit 12 whereupon the transistor 10 turns "off." Since current flow in the primary winding 16 ceases, the magnetic field surrounding the primary winding 16 collapses and induces a voltage in the secondary winding 28 in a proper polarity as shown by the polarity dots to turn the N–P–N output transistor 38 "on." Current then flows between the collector and emitter of transistor 38 through the load 42 as well as the second secondary winding 30. Since the ends of the windings 28 and 30 which are common to the terminal 32 are oppositely poled relative to each other, said end of winding 30 is of the same polarity as that appearing at terminal 36. As such a positive feedback exists through winding 30 which is a function of the load current flowing through load 42 and which induces a voltage in the secondary 28 to aid the "turn on" of transistor 38. Since the turns ratio $N_{28}/N_{30}$ is in the order of 10/1, the base of transistor 38 is driven with approximately one-tenth of the load current flowing through transistor 38 driving it into the saturation region of its current-voltage characteristic, meaning that for all practical purposes transistor 38 behaves like a closed switch having an extremely small internal resistance thereacross. Since the output load 42 is in series with the output transistor 38, it acts merely as a series switch; however, the base drive of transistor 38 is determined partly by the output load current. No power loss occurs in the base drive circuit of transistor 38 due to the absence of any resistance in the circuit between the secondary winding 28 and the base of transistor 38 thereby appreciably increasing the efficiency of the circuit.

The series output transistor 38 is turned "off" by the control circuit 12 in the following manner. A control signal in the form of a positive base drive voltage is applied to the transistor 10 driving it into saturation. At that instant the voltage polarity of terminal 14 of the primary winding 16 is positive with respect to terminal 20 due to the base drive current of transistor 38 flowing in the secondary winding 28, whereupon the polarity dots dictate that both terminals 14 and 36 be positive relative to the respective opposite terminals 20 and 32. This condition causes a current flow through the semiconductor diode 26, the primary winding 16, and transistor 10. The conducting transistor 10 and the semiconductor diode 26 places an extremely small impedance across the terminals 14 and 20 of the primary winding 16 which is reflected by the factor $(N_{16}/N_{28})^2$ to the terminals 36 and 32 of the primary winding 28 as a virtual short circuit. The virtual short circuit between the base and the emitter of the series output transistor 38 then acts to divert the positive feedback ampere-turns from the base of transistor 38 to the collector circuit of transistor 10. The stored carriers in the base region of the transistor 38 are also allowed to discharge into the low impedance path of the secondary winding 28 accelerating or producing a rapid "turnnoff" of transistor 38. When the reverse base current flowing through the secondary winding 28 as a result of the stored carriers ceases the end terminal 20 now becomes positive relative to the end terminal 14 causing the semiconductor diode 26 to turn "off." When the reverse base current of transistor 38 ceases, the positive potential of the supply source 22 applied to the end terminal 20 through the resistor 24 resets the flux in the core 34 back point A as shown in FIG. 2. That is, the current through resistor 24 and the transistor 10 will cause the flux to traverse the path from B to C and back towards A. Additionally, as the flux is driven from point C towards A, a negative voltage is induced across the secondary winding 28 which holds transistor 38 "off." The action of the semiconductor diode in combination with winding 28 and resistor 24 then acts to turn transistor 38 "off" and hold it off in a very reliable manner.

Figure 3:
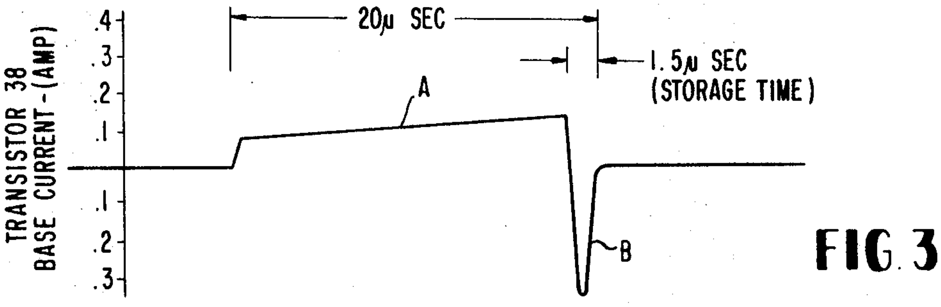
FIG. 3 is a diagram of a typical base current waveform for the output switch transistor in the embodiment shown in FIG. 1.

Considering briefly FIG. 3, there is shown a typical base current waveform for the series output transistor 38 where the circuit shown in FIG. 1 was utilized in a regulator circuit. The transistor 38 was turned "on" for 20 microseconds as shown by reference character A whereupon the forward base drive current varied between 100 and 150 ma. On "turnoff" the storage time of the carriers was in the order of 1.5 microseconds as shown by reference character B and the peak reverse base current was in the order of 350 ma. It was also noticed that when the switch transistor 28 was turned on for variable time intervals, the reverse base current did not vary significantly nor was the storage time effected.

Primary winding 16 therefore serves the dual purpose of: (1) providing a path to divert the base current of transistor 38 during turnoff, and (2) providing a means whereby the bias current through resistor 24 can reset the core 34 of the transformer 18. With present transistors the number of turns of the primary winding 16 required to satisfy both conditions are the same when the supply volts are 10 volts or more. With lower supply voltages, however, the L/R time constant of the bias circuit (winding 16 and resistor 24) gets undesirably long. To shorten the time constant one can reduce the turns of primary winding 16; however, this has the undesirable effect on the turnoff characteristics of transistor 38 in that a lower primary to secondary turns ratio reflects a higher impedance to secondary winding 28 and as a result the base drive current of transistor 38 is less effectively diverted. Thus the circuit disclosed in FIG. 1 tends to operate optimally only with power supplies of a given range of voltages.

A second embodiment of the invention is shown in FIG. 4 and provides a means of impedance matching such that during the period of diverting the base drive current of transistor 38 an optimum transformer turns ratio $(N_{16}/N_{28})$ can be obtained and later during the core reset period an optimum smaller number of turns of the primary winding 16 can be used for the bias current such that sufficiently short L/R time constant can be obtained for the bias circuit. The embodiment shown in FIG. 4 is similar to FIG. 1, however, the primary winding 16 includes an intermediate terminal 21 to which the bias resistor 24 is connected. The turns of primary winding appearing between terminals 14 and 20 are selected to provide a proper match to divert the base drive of transistor 38. In order to speed up the reset procedure, however, the bias current is made to flow only through a portion 17 of primary winding 16 between terminals 14 and 21. The inductance of the winding portion 17 is less than the total winding 16, however, the resistance of resistor 24 must be decreased to maintain an adequate ampere turns bias, the net result being that the inductance reduces faster than the resistance so that obtaining an L/R is but a matter of choosing the proper turns between terminals 14 and 21.

In some applications, for example where the B+ supply voltage is relatively high, it may be desirable to interchange the connections of the diode 26 and the resistor 24 as shown in FIG. 4. In all circuits, however, the transformer turns between the collector of transistor 10 and the diode 26 should be at least eight but preferably 10 times the number of turns in the secondary winding 28.

Also the second embodiment of the subject invention includes a second semiconductor diode 46 shunting transistor 10 by having its cathode electrode directly connected to the collector while its anode electrode is directly connected to the emitter. A third semiconductor diode 48 is shunted across the resistor 24 such that it would normally be nonconducting due to the positive B+ supply potential of the supply source 22. This means that the cathode electrode of the semiconductor diode 48 is common to the positive terminal of the supply source 22. These added components allow for unexpected operating conditions of the circuit such as, for example, where point B as shown in FIG. 2 would occur above the H axis of the hysteresis curve. When this condition exists, the switching transistor 10 would ordinarily be required to conduct in the reverse direction and could be tolerated if the transistor selected had sufficient reverse Beta. The semiconductor 46 on the other hand provides a shunt of proper polarity to bypass any reverse current around the transistor 10. Also under the same conditions, it might be desirable to limit the reverse base voltage applied to the output switch transistor 38 to in this example 28 volts/$(N_{16}/N_{28})$ which would be provided by the addition of the third semiconductor diode 48 shunting the resistor 24.

Figure 5:
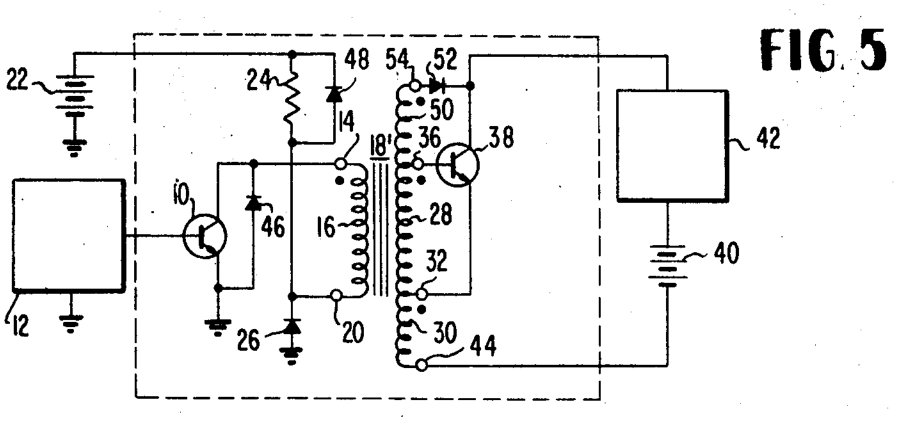
FIG. 5 is an electrical schematical diagram illustrative of a third embodiment of the subject invention.

The third embodiment of the subject invention as shown by FIG. 5 is identical to the embodiment shown with respect to FIG. 4 with the exception that a third secondary winding 50 in series combination with a fourth semiconductor diode 52 is connected across the base and collector of the output transistor 38. One end of the third semiconductor winding 50 is common to the terminal 36 while the opposite end which is common to terminal 54 is directly connected to the anode electrode of the diode 52. The cathode of diode 52 is directly connected to the collector of transistor 38. The circuit comprising the third secondary winding 50 and the diode 52 provides a nonlinear negative feedback from the collector to the base to prevent the transistor 38 from going into "deep" saturation; that is, the transistor drive is caused to "turnon" the transistor 38 only in a sufficient amount to act as a closed switch. Any further base drive serves no useful purpose and does not appreciably reduce the internal impedance of the device, but merely increases the stored carriers in the base circuit. When transistor 38 is "on," the $V_{be}$ drop exists between terminals 36 and 32. Due to the winding 50, however, a higher voltage with respect to the emitter of transistor 38 will exist at the anode of the semiconductor diode 52. The voltage induced in the winding 50 will cause the diode 52 to tend to conduct before the base-collector junction of transistor 38 becomes forward biased when the collector voltage of transistor 38 is driven towards saturation. When the semiconductor diode 52 is driven to conduction, the added load on the transformer 18 reduces the base drive to transistor 38 which acts to keep transistor 38 out of saturation, thus reducing storage time on "turnoff."

By varying the turns ratios of the winding of transformer 18, the series output switch transistor 38 can be operated with various degrees of saturation and power dissipation. Since the base drive current is a function of the collector current determined precisely by the transformer turns ratio, only the proper amount of base drive is applied resulting in increased efficiency; no additional power is wasted in excess drive or added voltage drops. Due to the impedance matching of transformer 18, the current handling requirements of the control switch transistor 10 are but one-tenth that of the base drive of the series output switch transistor 38. Moreover, the method of removing the stored carriers in the transistor 38 does not depend upon supplying stored energy from other circuits components.

The subject invention thus performs the desired functions with unusual simplicity and efficiency under adverse operating conditions, resulting in increased reliability of equipment and reduced costs.

It should be understood that the N–P–N system was described for illustrative purposes only and other circuit modifications may be resorted to when desirable such as the use of both P–N–P and N–P–N transistors as well as various field effect transistors. With a P–N–P and N–P–N combination the reversal in polarity of some windings become necessary; however, this is within the purview of one skilled in the art. Also a plurality of primary windings may be utilized when desirable, however they are then interconnected as taught by the embodiments disclosed in the subject invention.

I claim as my invention:

1. A transistor switch circuit operated from a control signal source and powered by a first and second supply potential comprising in combination:

an electrical transformer comprising at least one primary winding having a plurality of turns and a first and a second secondary winding each respectively having a plurality of turns and each winding including first and second circuit terminals respectively connected to the ends thereof, all said windings being wound in predetermined directions wherein said first circuit terminals thereof have like instantaneous voltage polarities;

a first transistor including a control electrode and a first and a second output electrode and including circuit means coupling said control terminal to said control signal source, circuit means coupling the first output electrode to one end of said primary winding and the second output electrode to a point of reference potential, said control signal source being adapted to couple a control signal to said first transistor for selectively rendering said transistor conducting and nonconducting;

first diode means coupled to a first predetermined number of turns of said primary winding at a circuit point away from said one end and being selectively poled to become conductive when said circuit point has a negative voltage polarity with respect to said one end;

an electrical resistor of a predetermined ohmic value connected in series between said first supply potential and a second predetermined number of turns of said primary winding at a circuit point away from said one end;

a second transistor having a control electrode and a first and a second output electrode and including circuit means directly connecting said control electrode to said first circuit terminal of said first secondary winding and said second output electrode to said second circuit terminal of said first secondary winding;

an output load;

and circuit means series coupling said output load, said second secondary winding, and said second supply potential across said first and second output electrodes of said second transistor, said first circuit terminal of said second secondary winding being coupled to said second output electrode of said second transistor, said second transistor being rendered conductive when said first transistor is rendered nonconductive by means of the flux change in said primary winding effecting a voltage in said first secondary winding with an additional positive feedback being provided by said second secondary winding which is a function of a current flow in said output load, said second transistor being subsequently rendered nonconductive by means of a substantial short circuit being reflected across first secondary winding caused by temporary current flow through said first diode means when said first transistor is again driven conductive.

2. The invention as claimed by claim 1 wherein said first predetermined number of turns in said primary winding is greater than said plurality of turns in said first secondary winding.

3. The invention as defined by claim 1 wherein the turns ratio of said first predetermined number of turns in said primary winding relative to said first secondary winding is in the order of 10 to one.

4. The invention as defined by claim 1 and wherein the ratio of the predetermined number of windings in said first secondary winding to said second secondary winding is in the order of 10 to one.

5. The invention as defined by claim 1 wherein said input control electrode of said first and second transistor comprises the base electrode and said first and second output current electrodes comprise the collector and emitter electrode respectively.

6. The invention as defined by claim 1 wherein said first and second predetermined number of turns of said primary winding are substantially equal in number:

7. The invention as defined by claim 1 wherein said first predetermined number of turns of said primary winding is greater than said second predetermined number of turns of said primary winding.

8. The invention as defined by claim 1 and additionally including second diode means coupled across said first and second output current electrodes of said first transistor and being selectively poled to prevent reverse current from flowing in said first transistor.

9. The invention as defined by claim 1 and additionally including third diode means connected across said resistor means and being selectively poled to be normally nonconductive when said first supply potential is applied.

10. The invention as defined by claim 1 and additionally including a third secondary winding having a plurality of turns and including a first and a second circuit terminal respectively connected to the ends thereof and wherein said first circuit terminal exhibits the same instantaneous voltage polarity as said first terminal of said first secondary winding and including circuit means connecting the second circuit terminal thereof to said first terminal of said first secondary winding and circuit means coupling said first circuit terminal of said third secondary winding to said first output electrode of said second transistor.

11. The invention as defined by claim 9 wherein said last-mentioned circuit means comprises a fourth diode connected in a predetermined polarity direction between said first circuit terminal of said third secondary winding and said first output current electrode of said second transistor, said third secondary winding and said fourth diode means providing a nonlinear negative feedback to said second transistor for preventing deep saturation thereof when rendered conductive.